(12) United States Patent
Abe et al.

(10) Patent No.: US 9,776,243 B2
(45) Date of Patent: Oct. 3, 2017

(54) METHOD FOR MANUFACTURING THREE-DIMENSIONAL SHAPED OBJECT

(71) Applicant: PANASONIC INTELLECTUAL PROPERTY MANAGEMENT CO., LTD., Osaka (JP)

(72) Inventors: Satoshi Abe, Osaka (JP); Masataka Takenami, Aichi (JP); Isamu Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/123,114

(22) PCT Filed: Mar. 4, 2015

(86) PCT No.: PCT/JP2015/001156
§ 371 (c)(1),
(2) Date: Sep. 1, 2016

(87) PCT Pub. No.: WO2015/133138
PCT Pub. Date: Sep. 11, 2015

(65) Prior Publication Data
US 2017/0066052 A1    Mar. 9, 2017

(30) Foreign Application Priority Data
Mar. 5, 2014    (JP) .................. 2014-043107

(51) Int. Cl.
*B23K 26/16*    (2006.01)
*B22F 3/105*    (2006.01)
(Continued)

(52) U.S. Cl.
CPC .......... *B22F 3/1055* (2013.01); *B23K 26/082* (2015.10); *B23K 26/342* (2015.10);
(Continued)

(58) Field of Classification Search
CPC ... B23K 26/0093; B23K 26/16; B22F 3/1055; B22F 2003/1056; B22F 2003/247; B29C 67/0077
(Continued)

(56) References Cited

U.S. PATENT DOCUMENTS

| 5,151,813 A | 9/1992 | Yamamoto et al. |
| 5,534,104 A | 7/1996 | Langer et al. |

(Continued)

FOREIGN PATENT DOCUMENTS

| JP | 01-502890 | 10/1989 |
| JP | 2-239921 | 9/1990 |

(Continued)

OTHER PUBLICATIONS

Extended European Search Report for EP 15758805.4 dated Feb. 6, 2017.

(Continued)

*Primary Examiner* — Colleen Dunn
*Assistant Examiner* — Anthony Liang
(74) *Attorney, Agent, or Firm* — Greenblum & Bernstein, P.L.C.

(57) ABSTRACT

A selective laser sintering method reduces a warping deformation of a three-dimensional shaped object, the warping deformation being due to the scanning of a light beam. The manufacturing method is a method for manufacturing a three-dimensional shaped object by alternate repetition of a powder-layer forming and a solidified-layer forming, wherein a scanning of the light irradiation is divided into light beam-scannings "A" and "B", the light beam-scanning "A" being for the light irradiation of a peripheral portion corresponding to a periphery of the three-dimensional shaped object, and the light beam-scanning "B" being for the light irradiation of an internal portion corresponding to a (Continued)

region of the three-dimensional shaped object, the region being located inside the periphery. In particular, the peripheral portion is subjected to a discontinuous light beam-irradiation in the light beam-scanning "A" such that an irradiation path of the light beam is divided into a plurality of sub-irradiation paths.

4 Claims, 7 Drawing Sheets

(51) Int. Cl.
*B33Y 30/00* (2015.01)
*B29C 67/00* (2017.01)
*B33Y 10/00* (2015.01)
*B33Y 70/00* (2015.01)
*B23K 26/082* (2014.01)
*B23K 26/342* (2014.01)
*B22F 3/24* (2006.01)
*B23K 103/00* (2006.01)

(52) U.S. Cl.
CPC ...... *B29C 67/0077* (2013.01); *B29C 67/0092* (2013.01); *B33Y 10/00* (2014.12); *B33Y 30/00* (2014.12); *B33Y 70/00* (2014.12); *B22F 2003/1056* (2013.01); *B22F 2003/1057* (2013.01); *B22F 2003/247* (2013.01); *B22F 2998/10* (2013.01); *B23K 2203/42* (2015.10); *Y02P 10/295* (2015.11)

(58) Field of Classification Search
USPC ............................................ 419/28; 264/497
See application file for complete search history.

(56) References Cited

U.S. PATENT DOCUMENTS

| | | |
|---|---|---|
| 2004/0061260 A1 | 4/2004 | Heugel |
| 2013/0264750 A1 | 10/2013 | Hofacker et al. |
| 2015/0017055 A1 | 1/2015 | Abe et al. |
| 2015/0183165 A1 | 7/2015 | Abe et al. |

FOREIGN PATENT DOCUMENTS

| | | |
|---|---|---|
| JP | 6-254971 | 9/1994 |
| JP | 7-503915 | 4/1995 |
| JP | 2000-073108 | 3/2000 |
| JP | 2001-38813 | 2/2001 |
| JP | 2002-86575 | 3/2002 |
| JP | 2004-130793 | 4/2004 |
| JP | 2010-052318 | 3/2010 |
| WO | 88-02677 | 4/1988 |
| WO | 91-06378 | 5/1991 |
| WO | 2013/132840 | 9/2013 |
| WO | 2014/010144 | 1/2014 |

OTHER PUBLICATIONS

International Search Report issued in International Application No. PCT/JP2015/001156, dated May 26, 2015, along with English-language translation.

English-language translation of International Preliminary Report on Patentability issued in International Application No. PCT/JP2015/001156, dated Sep. 6, 2016.

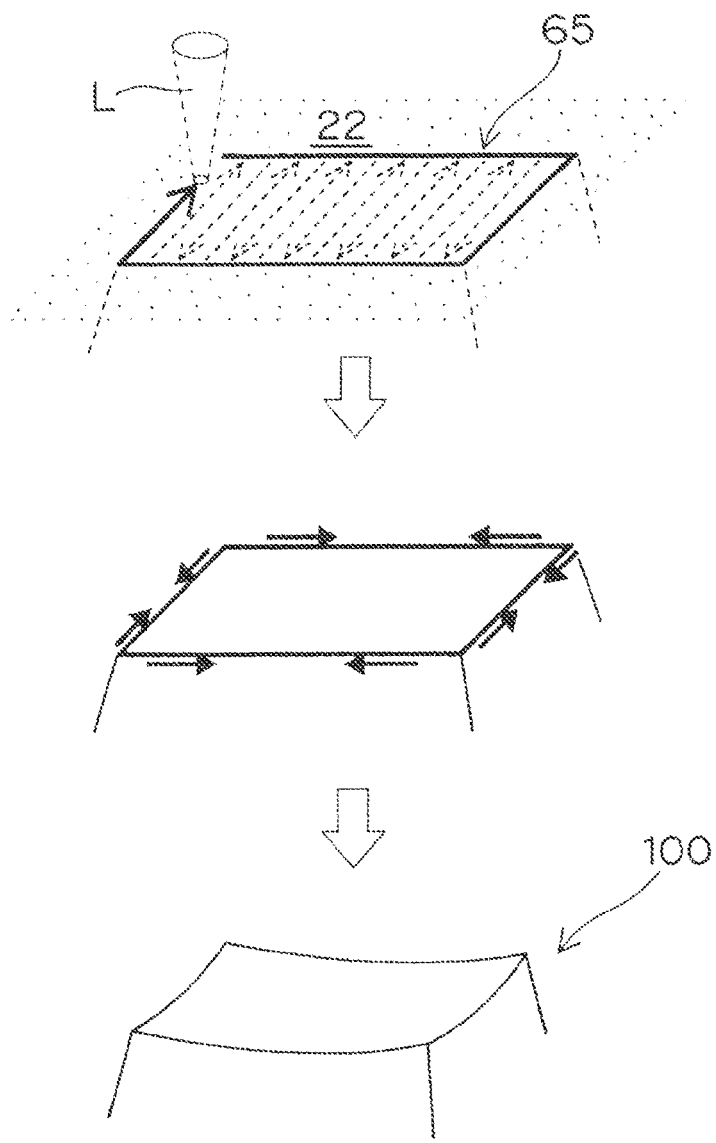

METHOD FOR MANUFACTURING THREE-DIMENSIONAL SHAPED OBJECT

TECHNICAL FIELD

The disclosure relates to a method for manufacturing a three-dimensional shaped object. More particularly, the disclosure relates to a method for manufacturing a three-dimensional shaped object, in which a formation of a solidified layer is performed by an irradiation of a powder layer with a light beam.

BACKGROUND OF THE INVENTION

Heretofore, a method for manufacturing a three-dimensional shaped object by irradiating a powder material with a light beam has been known (such method can be generally referred to as "selective laser sintering method"). The method can produce the three-dimensional shaped object by an alternate repetition of a powder-layer forming and a solidified-layer forming on the basis of the following (i) and (ii):

(i) forming a solidified layer by irradiating a predetermined portion of a powder layer with a light beam, thereby allowing a sintering of the predetermined portion of the powder or a melting and subsequent solidification of the predetermined portion; and (ii) forming another solidified layer by newly forming a powder layer on the formed solidified layer, followed by similarly irradiating the powder layer with the light beam. See JP-T-01-502890 or JP-A-2000-73108, for example.

This kind of technology makes it possible to produce the three-dimensional shaped object with its complicated contour shape in a short period of time. The three-dimensional shaped object can be used as a metal mold in a case where inorganic powder material (e.g., metal powder material) is used as the powder material. While on the other hand, the three-dimensional shaped object can also be used as various kinds of models or replicas in a case where organic powder material (e.g., resin powder material) is used as the powder material.

Taking a case as an example wherein the metal powder is used as the powder material, and the three-dimensional shaped object produced therefrom is used as the metal mold, the selective laser sintering method will now be briefly described. As shown in FIGS. 5A-5C, a powder layer 22 with its predetermined thickness is firstly formed on a base plate 21 by a movement of a squeegee blade 23 (see FIG. 5A). Then, a predetermined portion of the powder layer is irradiated with a light beam "L" to form a solidified layer 24 (see FIG. 5B). Another powder layer is newly provided on the solidified layer thus formed, and is irradiated again with the light beam to for another solidified layer. In this way, the powder-layer forming and the solidified-layer forming are alternately repeated, and thereby allowing the solidified layers 24 to be stacked with each other (see FIG. 5C). The alternate repetition of the powder-layer forming and the solidified-layer forming leads to a production of a three-dimensional shaped object with a plurality of the solidified layers integrally stacked therein. The lowermost solidified layer 24 can be provided in a state of being adhered to the surface of the base plate 21. Therefore, there can be obtained an integration of the three-dimensional shaped object and the base plate. The integrated "three-dimensional shaped object" and "base plate" can be used as the metal mold as they are.

PATENT DOCUMENTS

Related Art Patent Documents

PATENT DOCUMENT 1: Japanese Unexamined Patent Application Publication No. H01-502890
PATENT DOCUMENT 2: Japanese Unexamined Patent Application Publication No. 2000-73108

DISCLOSURE OF THE INVENTION

Problems to be Solved by the Invention

With respect to the selective laser sintering method, the inventors of the present application have found that a scanning of the light beam can bring about a warp of the three-dimensional shaped object. Specifically, the inventors have found that the warp of the manufactured three-dimensional shaped object can occur in a case where the scanning for the light irradiation is divided into sub-scannings for "peripheral portion" and "internal portion", the peripheral portion corresponding to an outer surface portion of the three-dimensional shaped object, i.e., an outer peripheral contour of the object, the internal portion corresponding to an internal region located inside the outer surface portion of the three-dimensional object. While not intending to be bound by any specific theory, it can be presumed that the cause of the warping deformation of the three-dimensional shaped object has something to do with the light beam irradiation for the peripheral portion.

Under these circumstances, the present invention has been created. That is, an object of the present invention is to provide the selective laser sintering method which is capable of reducing the warping deformation of the three-dimensional shaped object.

Means for Solving the Problems

In order to achieve the above object, an embodiment of the present invention provides a method for manufacturing a three-dimensional shaped object by alternate repetition of a powder-layer forming and a solidified-layer forming, the repetition comprising:

(i) forming a solidified layer by irradiating a predetermined portion of a powder layer with a light beam, thereby allowing a sintering of the powder in the predetermined portion or a melting and subsequent solidification of the powder; and (ii) forming another solidified layer by newly forming a powder layer on the formed solidified layer, followed by irradiation of a predetermined portion of the newly formed powder layer with the light beam, wherein a scanning of the light irradiation is divided into light beam-scannings "A" and "B", the light beam-scanning "A" being for the light irradiation of a peripheral portion corresponding to a periphery of the three-dimensional shaped object, the light beam-scanning "B" being for the light irradiation of an internal portion corresponding to a region of the three-dimensional shaped object, the region being located inside the periphery, and wherein the peripheral portion is subjected to a discontinuous light beam-irradiation in the light beam-scanning "A" such that an irradiation path of the light beam is divided into a plurality of sub-irradiation paths.

Effect of the Invention

The division of the irradiation path for the light beam-scanning "A" into a plurality of the sub-irradiation paths in accordance with an embodiment of the present invention makes it possible to reduce the warping deformation of the three-dimensional shaped object. In other words, the warping deformation of the three-dimensional shaped object can be suppressed by the discontinuous light beam-irradiation of the peripheral portion corresponding to the periphery of the three-dimensional shaped object.

BRIEF DESCRIPTION OF THE DRAWINGS

FIG. 8 includes schematic views illustrating the phenomenon found by the inventors of the present application.

MODES FOR CARRYING OUT THE INVENTION

Figure 1:
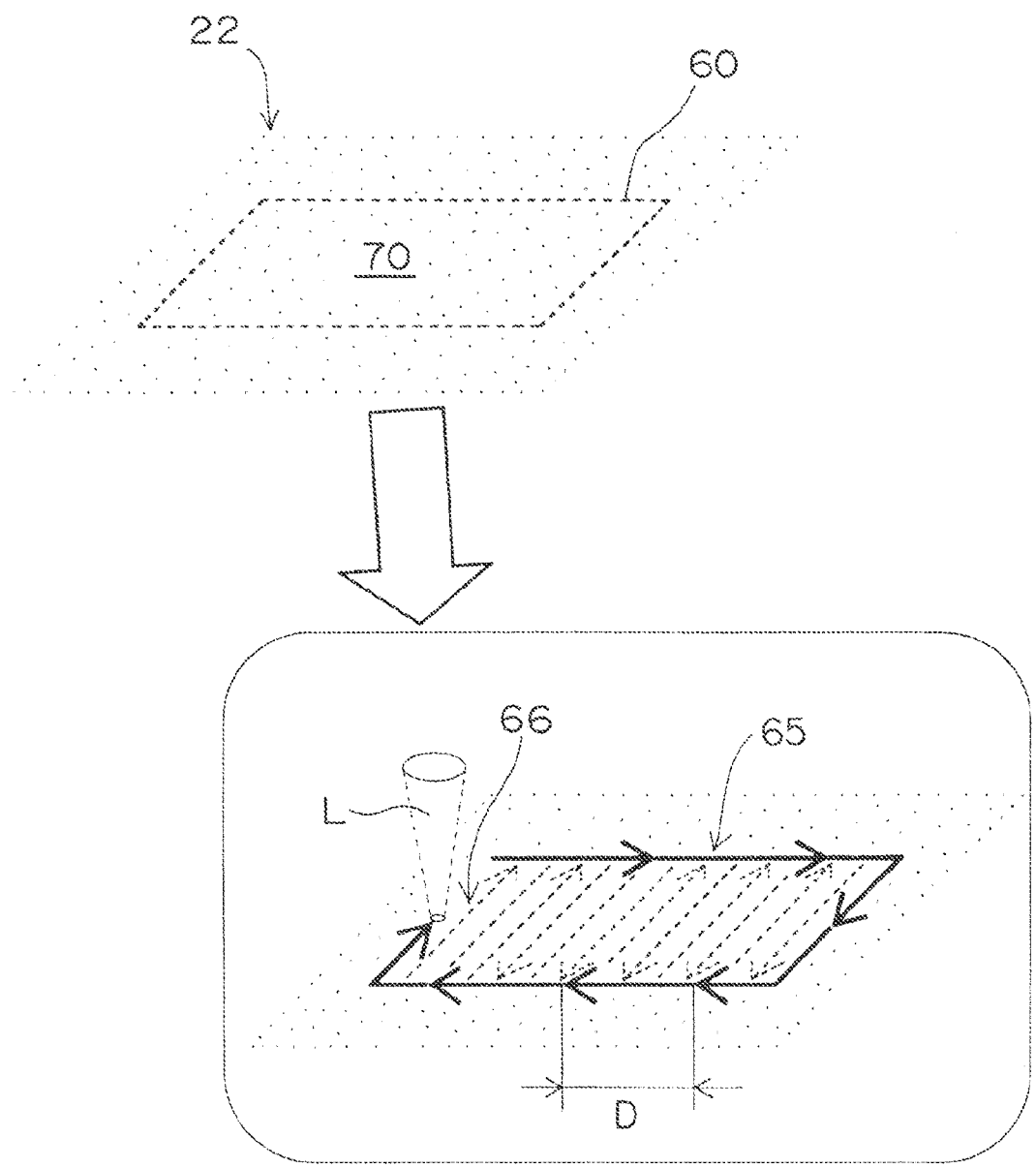
FIG. 1 includes schematic views showing a general concept according to an embodiment of the present invention.

The manufacturing method according to an embodiment of the present invention will be described in more detail with reference to the accompanying drawings. It should be noted that configurations/forms and dimensional proportions in the drawings are merely for illustrative purposes, and thus not the same as those of the actual parts or elements.

The term "powder layer" as used in this description and claims means a "metal powder layer made of a metal powder" or "resin powder layer made of a resin powder", for example. The term "predetermined portion of a powder layer" as used herein substantially means a portion of a three-dimensional shaped object to be manufactured. As such, a powder present in such predetermined portion is irradiated with a light beam, and thereby the powder undergoes a sintering or a melting and subsequent solidification to form a shape of a three-dimensional shaped object. Furthermore, the term "solidified layer" substantially means a "sintered layer" in a case where the powder layer is a metal powder layer, whereas term "solidified layer" substantially means a "cured layer" in a case where the powder layer is a resin powder layer.

[Selective Laser Sintering Method]

Figure 6:
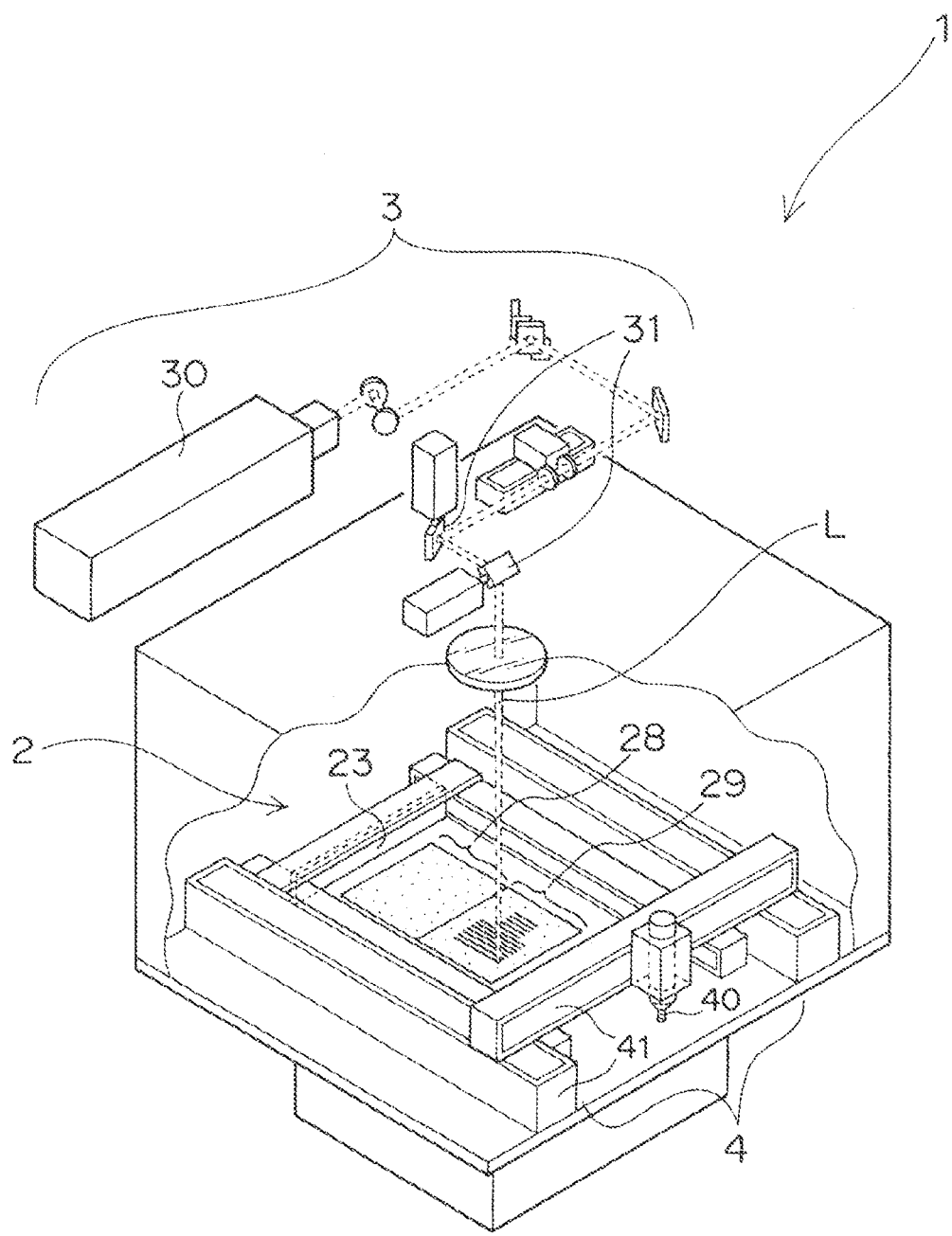
FIG. 6 is a perspective view schematically illustrating a construction of a laser-sintering/machining hybrid machine.
Figure 7:
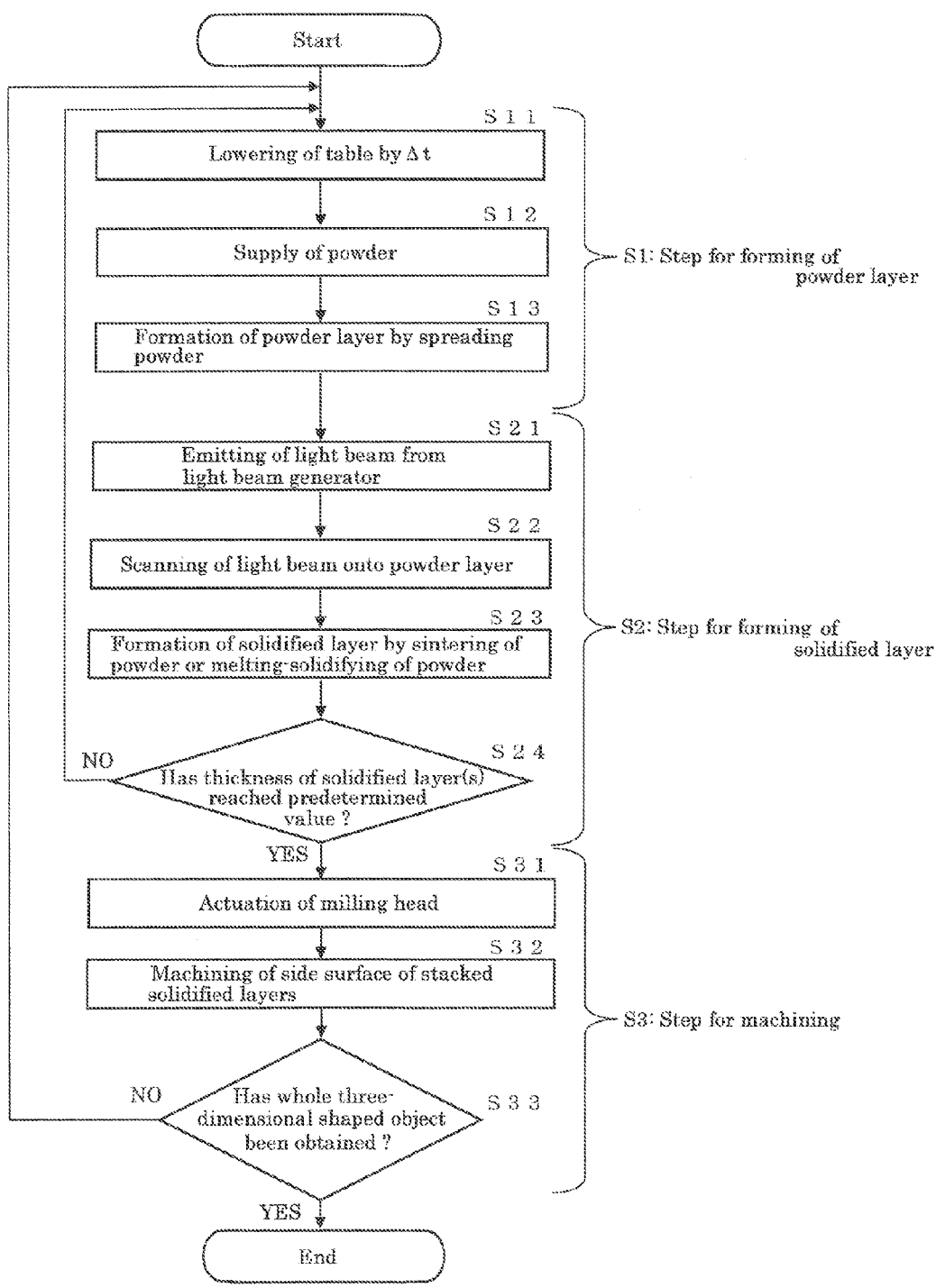
FIG. 7 is a flow chart of general operations of a laser-sintering/machining hybrid machine.

First of all, a selective laser sintering method, on which an embodiment of the manufacturing method of the present invention is based, will be described. By way of example, a laser-sintering/machining hybrid process wherein a machining is additionally carried out in the selective laser sintering method will be explained. FIG. 5 schematically shows a process embodiment of the laser-sintering/machining hybrid. FIGS. 6 and 7 respectively show major constructions and operation flow regarding a metal laser sintering hybrid milling machine for enabling an execution of a machining process as well as the selective laser sintering method.

As shown in FIGS. 5 and 6, the laser-sintering/milling hybrid machine 1 is provided with a powder layer former 2, a light-beam irradiator 3, and a machining means 4.

The powder layer former 2 is a means for forming a powder layer with its predetermined thickness through a supply of powder (e.g., a metal powder or a resin powder). The light-beam irradiator 3 is a means for irradiating a predetermined portion of the powder layer with a light beam "L". The machining means 4 is a means for milling the side surface of the stacked solidified layers, i.e., the surface of the three-dimensional shaped object.

Figure 5A:
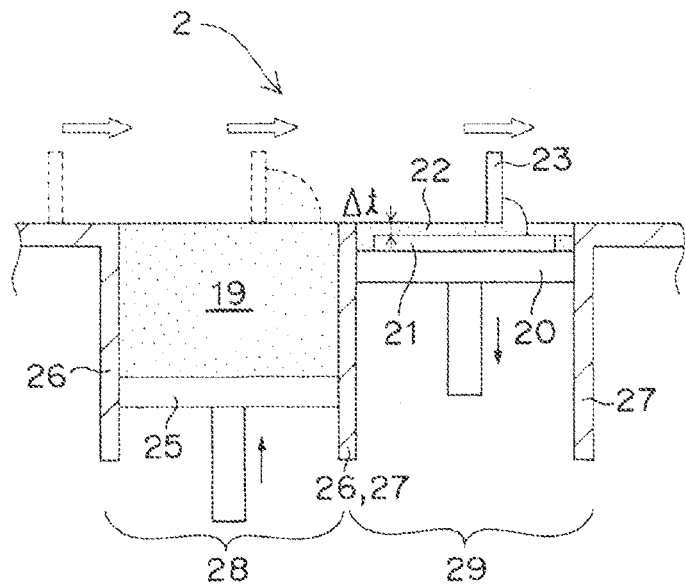
FIGS. 5A, 5B, and 5C include cross-sectional views schematically illustrating a laser-sintering/machining hybrid process wherein a machining is additionally carried out in the selective laser sintering method.
Figure 5B:
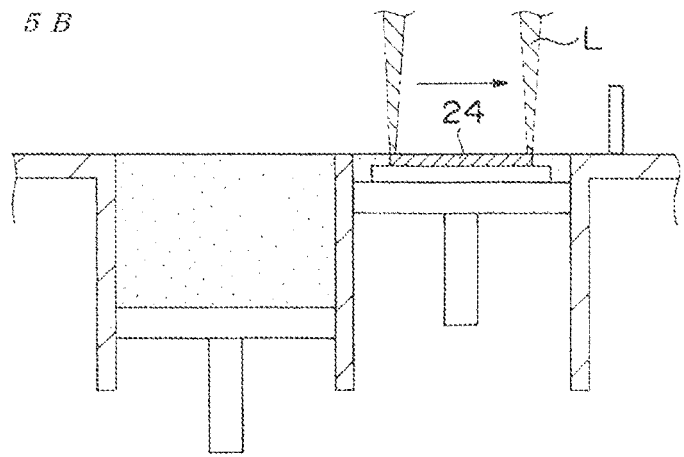
Figure 5C:
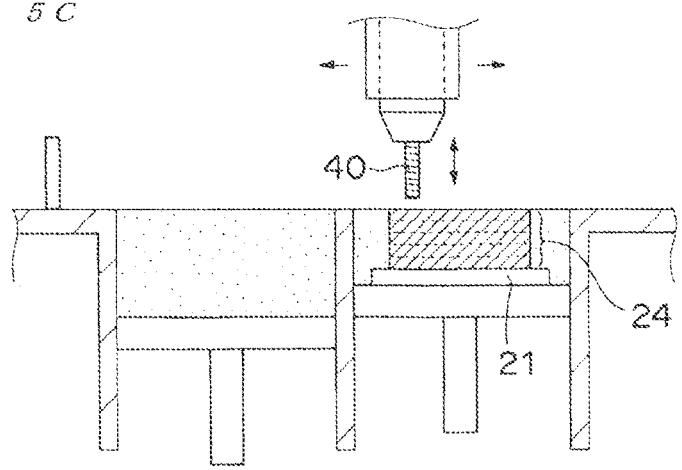

As shown in FIGS. 5A-5C, the powder layer former 2 is mainly composed of a powder table 25, a squeegee blade 23, a forming table 20 and a base plate 21. The powder table 25 is a table capable of vertically elevating/descending in a "storage tank for powder material" 28 whose outer periphery is surrounded with a wall 26. The squeegee blade 23 is a blade capable of horizontally moving to spread a powder 19 from the powder table 25 onto the forming table 20, and thereby forming a powder layer 22. The forming table 20 is a table capable of vertically elevating/descending in a forming tank 29 whose outer periphery is surrounded with a wall 27. The base plate 21 is a plate for a shaped object. The base plate is disposed on the forming table 20 and serves as a platform of the three-dimensional shaped object.

As shown in FIG. 6, the light-beam irradiator 3 is mainly composed of a light beam generator 30 and a galvanometer mirror 31. The light beam generator 30 is a device for emitting a light beam "L". The galvanometer mirror 31 is a means for scanning an emitted light beam "L" onto the powder layer, i.e., a scan means of the light beam "L".

As shown in FIG. 6, the machining means 4 is mainly composed of a milling head 40 and an actuator 41. The milling head 40 is a cutting tool for milling the side surface of the stacked solidified layers, i.e., the surface of the three-dimensional shaped object. The actuator 41 is a means for driving the milling head 40 to move toward the position to be milled.

Operations of the laser sintering hybrid milling machine 1 will now be described in detail. As can been seen from the flowchart of FIG. 7, the operations of the laser sintering hybrid milling machine are mainly composed of a powder layer forming step (S1), a solidified layer forming step (S2), and a machining step (S3). The powder layer forming step (S1) is a step for forming the powder layer 22. In the powder layer forming step (S1), first, the forming table 20 is descended by $\Delta t$ (S11), and hereby creating a level difference $\Delta t$ between an upper surface of the base plate 21 and an upper-edge plane of the forming tank 29. Subsequently, the powder table 25 is elevated by $\Delta t$, and then the squeegee blade 23 is driven to move from the storage tank 28 to the forming tank 29 in the horizontal direction, as shown in FIG. 5A. This enables a powder 19 placed on the powder table 25 to be spread onto the base plate 21 (S12), while forming the powder layer 22 (S13). Examples of the powder for the powder layer include a "metal powder having a mean particle diameter of about 5 μm to 100 μm" and a "resin powder having a mean particle diameter of about 30 μm to 100 μm (e.g., a powder of nylon, polypropylene, ABS or the like". Following this step, the solidified layer forming step (S2) is performed. The solidified layer forming step (S2) is a step for form in a solidified layer 24 through the light beam irradiation. In the solidified layer forming step (S2), a light beam "L" is emitted from the light beam generator 30 (S21).

The emitted light beam "L" is scanned onto a predetermined portion of the powder layer 22 by means of the galvanometer mirror 31 (S22). The scanned light beam can cause the powder in the predetermined portion of the powder layer to be sintered or be melted and subsequently solidified, resulting in a formation of the solidified layer 24 (S23), as shown in FIG. 5B. Examples of the light beam "L" include carbon dioxide gas laser, Nd:YAG laser, fiber laser, ultraviolet light, and the like.

The powder layer forming step (S1) and the solidified layer forming step (S2) are alternately repeated. This allows a plurality of the solidified layers 24 to be integrally stacked with each other, as shown in FIG. 5C.

When the thickness of the stacked solidified layers 24 reaches a predetermined value (S24), the machining step (S3) is initiated. The machining step (S3) is a step for milling the side surface of the stacked solidified layers 24, i.e., the surface of the three-dimensional shaped object. The milling head 40 (see FIG. 5C and FIG. 6) is actuated to initiate an execution of the machining step (S31). For example, in a case where the milling head 40 has an effective milling length of 3 mm, a machining can be performed with a milling depth of 3 mm. Therefore, supposing that "Δt" is 0.05 mm, the milling head 40 is actuated when the formation of the sixty solidified layers 24 is completed. Specifically, the side face of the stacked solidified layers 24 is subjected to the surface machining (S32) through a movement of the milling head 40 driven by the actuator 41. Subsequent to the surface machining step (S3), it is judged whether or not the whole three-dimensional shaped object has been obtained (S33). When the desired three-dimensional shaped object has not yet been obtained, the step returns to the powder layer forming step (S1). Thereafter, the steps S1 through S3 are repeatedly performed again wherein the further stacking of the solidified layers 24 and the further machining process therefor are similarly performed, which eventually leads to a provision of the desired three-dimensional shaped object.

[Manufacturing Method of the Present Invention]

An embodiment of the present invention is characterized by features associated with a scanning of the light beam in the selective laser sintering method as described above.

Specifically, the scanning of the light beam according to an embodiment of the present invention is divided into light beam-scannings "A" (65) and "B" (66), the light beam-scanning "A" (65) being for the light irradiation of a peripheral portion corresponding to a periphery of the three-dimensional shaped object, the light beam-scanning "B" (66) being for the light irradiation of an internal portion corresponding to a region of the three-dimensional shaped object, the region being located inside the periphery. A discontinuous light beam-irradiation is performed in the light beam-scanning "A" (65) such that an irradiation path of the light beam "L" is divided into a plurality of sub-irradiation paths (see FIG. 1).

In other words, the manufacturing method according to an embodiment of the present invention is such that particular portion of the powder layer, which specifically corresponds to the periphery of the three-dimensional shaped object, is subjected to a discontinuous scanning of the light beam, not continuous scanning thereof. This discontinuous scanning makes it possible to suppress the warping deformation of the three-dimensional shaped object. While not intending to be bound by any specific theory, it can be presumed that, in a case of the continuous scanning of the light beam in the powder layer portion corresponding to the periphery of the three-dimensional shaped object, a contraction stress occurs along the periphery, and an increase of the remaining contraction stress (i.e., residual stress) can eventually cause the three-dimensional shaped object to be warped (see FIG. 8). In this regard, the discontinuous scanning of the light beam according to an embodiment of the present invention can advantageously divide the contraction stress, and thereby reducing the residual stress, which leads to a suppression of the warping deformation of the three-dimensional shaped object.

From a common point of view, it is hard to predict the extent of "warping" of the three-dimensional shaped object, and thus it is difficult to design the three-dimensional shaped object based on a preliminary assumption of the extent of the warping thereof. The manufacturing method according to an embodiment of the present invention can exclude such difficult design, i.e., the difficulty regarding such unpredictable phenomenon of the warping by "relatively simple modification of the light beam scanning".

The recognition of those skilled in the art at the time before the application is filed will now be described. So far, those skilled in the art had a preconceived idea that the three-dimensional shaped object is required to finally have a clean periphery since the periphery of the three-dimensional shaped object is an exposed outer surface portion. That is, the conventional recognition of those skilled in the art is that a continuous scanning of the light beam is required for the portion corresponding to the periphery of the three-dimensional shaped object. In this regard, the inventors of the present application have intensively studied the selective laser sintering method to find that even the discontinuous scanning of the light beam for the portion corresponding to the periphery of the three-dimensional shaped object cannot substantially impair the outer portion of the three-dimensional shaped object, while contributing to a suppression of the warping deformation of the three-dimensional shaped object.

The term "periphery" used herein means an outer surface section of the three-dimensional shaped object, i.e., an outer peripheral contour of the three-dimensional shaped object. In other words, the phrase "peripheral portion corresponding to a periphery of the three-dimensional shaped object" used herein corresponds to a peripheral section of "region of three-dimensional shaped object to be manufactured" defined in the powder layer. The periphery in the present invention may be regarded as having a width dimension in the outer peripheral contour of the three-dimensional shaped object, and thus the periphery in the present invention may correspond to a local portion which extends from the outermost surface of the three-dimensional shaped object to the inner point (i.e., the horizontal-direction inner point) by about 0.01 mm to about 1 mm. While on the other hand, term "the region being located inside the periphery" used herein means that a solid section of the three-dimensional shaped object. In other words, the phrase "internal portion corresponding to a region of the three-dimensional shaped object, the region being located inside the periphery" used herein corresponds to a section other than the peripheral section of "region of the three-dimensional shaped object to be manufactured" defined in the powder layer.

The manufacturing method according to an embodiment of the present invention is based on the condition that the scanning of the light irradiation is divided into "light beam-scanning "A" for the peripheral portion corresponding to a periphery of the three-dimensional shaped object" and "light beam-scanning "B" for the internal portion corresponding to a region of the three-dimensional shaped object, the region being located inside the periphery". With respect to the light beam-scanning "A", the peripheral portion corresponding to the periphery of the three-dimensional shaped object is subjected to the discontinuous light beam-irradiation such that the irradiation path of the light beam is divided into a plurality of sub-irradiation paths. The term "discontinuous light beam-irradiation" used herein means an intermittent irradiation of the light beam with its temporary halt, not a contiguous and seamless irradiation of the light beam. It is preferred that the temporary halt in the discontinuous light beam-irradiation is a time required for the sub-irradiation path, which has been most recently irradiated, to be sufficiently cooled down. By way of example, the temporary halt of the light beam irradiation for the discontinuous light beam-irradiation is preferably in the range of about 1 microsecond to about 1 second, and more preferably in the range of about 50 microseconds to about 100 microseconds.

In the manufacturing method according to an embodiment of the present invention, each of "a plurality of sub-irradiation paths" has length preferably in the range of about 1 mm to about 10 mm, more preferably in the range of about 3 mm to about 5 mm. That is, the discontinuous light beam-irradiation is preferably performed such that each of the divided sub-irradiation paths has the above length. Such length can contribute to a mere suitable reduction of the residual stress in the three-dimensional shaped object, which could be due to the division of the contraction stress, and thereby making it possible to effectively suppress the warping deformation of the three-dimensional shaped object. The length of each of "a plurality of sub-irradiation paths" means that a length dimension "D" along the longitudinal direction of the sub-irradiation path (see FIG. 1).

In the manufacturing method according to an embodiment of the present invention, a plurality of sub-irradiation paths can be regarded as paths obtained by the division of an annular irradiation path extending along the peripheral portion corresponding to the periphery of the three-dimensional shaped object. In other words, "a plurality of sub-irradiation paths", as a whole, can have annular form along the periphery of the three-dimensional shaped object. While on the other hand, "internal portion corresponding to a region of the three-dimensional shaped object, the region being located inside the periphery" may have a parallel form of a plurality of linear irradiation paths therein. That is, as for the light beam-scanning "B" for the internal portion corresponding to the region of the three-dimensional shaped object, the light beam may be scanned in the linear and parallel form. This means that the light beam-scanning "B" may be performed as a so-called "raster scanning".

Figure 2:
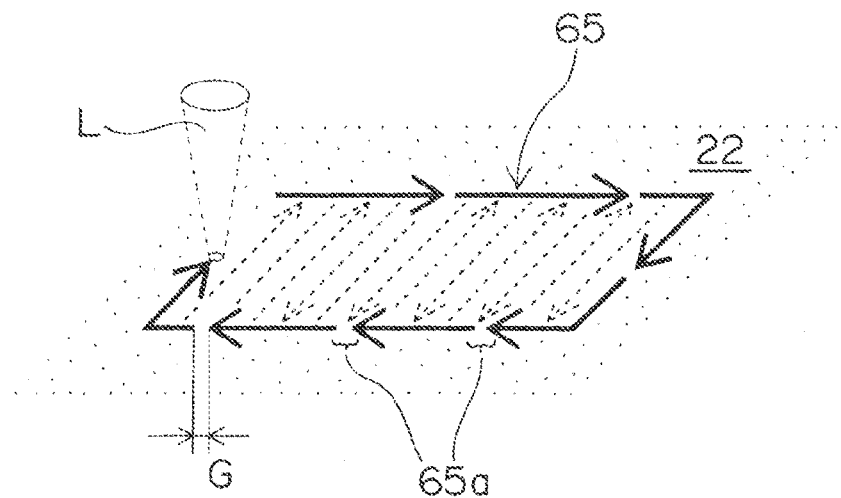
FIG. 2 is a schematic view illustrating a preferred embodiment of the present invention wherein adjacent sub-irradiation paths are spaced away from each other.

In the manufacturing method according to an embodiment of the present invention, the light beam in the light beam-scanning "A" may be scanned such that the adjacent sub-irradiation paths are spaced away from each other. That is, with respect to the discontinuous light beam-irradiation for the peripheral portion corresponding to the periphery of the three-dimensional shaped object, it is preferred that "ending point of the sub-irradiation path which has been most recently irradiated with the light beam" and "starting point of the sub-irradiation path to be subsequently irradiated with the light beam" do not become coincident with each other. The more detailed embodiment regarding this will be described. In a case where the light beam is scanned as the light beam-scanning "A" in the peripheral portion corresponding to the periphery of the three-dimensional shaped object such that the irradiation trajectory circularly moves in one direction, there is preferably provided a "break (65a)" in the light-beam irradiated portion as shown in FIG. 1. The dimension "G" of the break (65a) is preferably in the range of about 0.01 mm to about 0.5 mm, more preferably in the range of about 0.05 mm to about 0.1 mm (see FIG. 2). The presence of the break (65a) can promote the effect attributed to the division of the contraction stress, and thereby making it possible to effectively suppress the warping deformation of the three-dimensional shaped object.

Figure 3A:
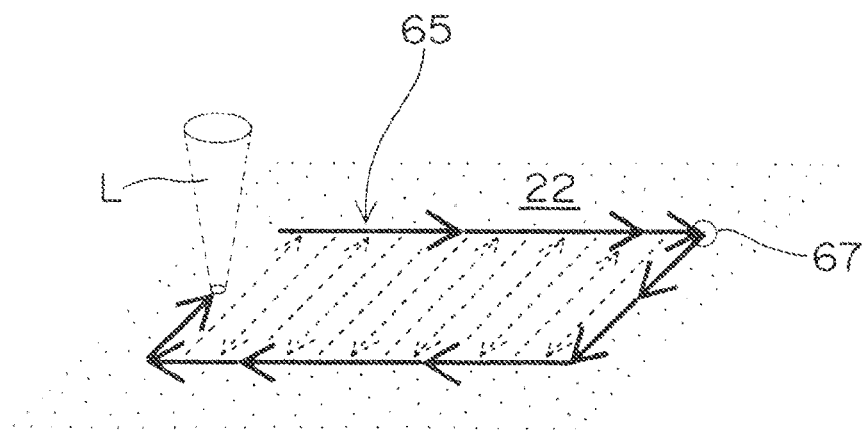
FIGS. 3a and 3B include schematic views illustrating a preferred embodiment of the present invention wherein a division of an irradiation path of a light beam is at a position corresponding to a corner of a three-dimensional shaped object.
Figure 3B:
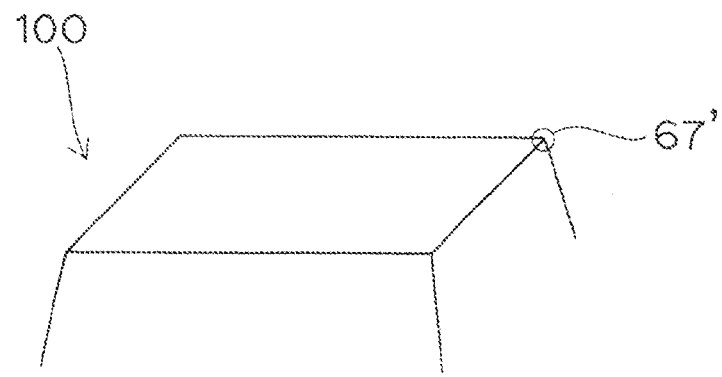

In the manufacturing method according to an embodiment of the present invention wherein the light beam irradiation path in the light beam-scanning "A" is divided into a plurality of sub-irradiation paths, it is preferred that the division of the irradiation path in the light beam-scanning "A" is at least at a position corresponding to a corner of the three-dimensional shaped object. In other words, the discontinuous light beam-irradiation is preferably performed such that an end point of at least one of the sub-irradiation paths is located at the position corresponding to the corner of the three-dimensional shaped object. This means that, as shown in FIG. 3, the irradiation path for the light beam-scanning "A" (65) is divided into two sub-irradiation paths at the point of the position 67 corresponding to the corner 67' of the three-dimensional shaped object 100.

From a common point of view, an excessive amount of the light beam energy tends to be provided at the position corresponding to the corner of the three-dimensional shaped object since a scanning speed of the light beam is needed to slow down at such corner position. This means that the solidified layer tends to adversely bulge at the corner position due to a solidification of the excessive amount of the powder. In this regard, the division of the irradiation path at the position corresponding to the corner of the three-dimensional shaped object according to the present invention can reduce the accumulated energy of the light beam irradiated portion at the corner position, and thereby suppressing the bulge in the solidified layer.

The term "corner of the three-dimensional shaped object" used herein generally means a corner point of the periphery of the three-dimensional shaped object, which corresponds to a point indicated by reference numeral "67'" in FIG. 2B. In other words, the corner of the three-dimensional shaped object corresponds to a scanning-direction change point in which the scanning direction of the light beam is required to be changed in the peripheral part of "region of three-dimensional shaped object to be manufactured" defined in the powder layer.

Figure 4:
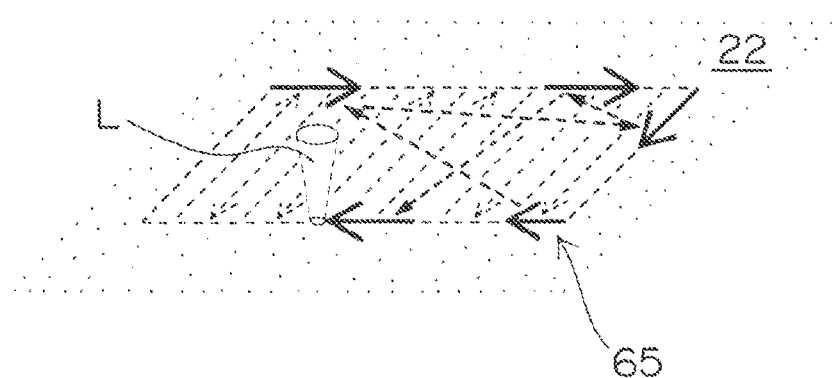
FIG. 4 is a schematic view illustrating a preferred embodiment of the present invention wherein a light beam is discretely scanned.

With respect to the light beam-scanning "A" (65), the light beam "L" may be discretely scanned such that the sub-irradiation paths which are to be adjacent to each ether are not continuously light-irradiated (see FIG. 4). In other words, the light beam-scanning "A", which is a scanning for the peripheral portion corresponding to the periphery of the three-dimensional shaped object, may be performed randomly in various directions. This allows the sub-irradiation path irradiated with the light beam to sufficiently cool down prior to the light beam irradiation of the subsequent sub-irradiation path. As a result, the effect attributed to the division of the contraction stress can be further promoted, making it possible to effectively suppress the warping deformation of the three-dimensional shaped object.

Although some embodiments of the present invention have been hereinbefore described, the present invention is not limited to these embodiments. It will be readily appreciated by those skilled in the art that various modifications/additional embodiments are possible without departing from the scope of the present invention. For example, the manufacturing method of the present invention can be applied to the selective laser sintering method not only with the machining process being additionally provided (see FIGS. 5 and 6), but also with no machining process being provided.

It should be noted that the present invention as described above includes the following aspects:

The first aspect: A method for manufacturing a three-dimensional shaped object by alternate repetition of a powder-layer forming and a solidified-layer forming, the repetition comprising:

(i) forming a solidified layer by irradiating a predetermined portion of a powder layer with a light beam, thereby sintering the powder in the predetermined portion or a melting and subsequently solidifying the powder; and (ii) forming another solidified layer by newly forming a powder layer on the formed solidified layer, followed by irradiation of a predetermined portion of the newly formed powder layer with the light beam, wherein a scanning of the light irradiation is divided into light beam-scannings "A" and "B", the light beam-scanning "A" being for the light irradiation of a peripheral portion corresponding to a periphery of the three-dimensional shaped object, and the light beam-scanning "B" being for the light irradiation of an internal portion corresponding to a region of the three-dimensional shaped object, the region being located inside the periphery, and wherein the peripheral portion is subjected to a discontinuous light beam-irradiation in the light beam-scanning "A" such that an irradiation path of the light beam is divided into a plurality of sub-irradiation paths.

The second aspect: The method according to the first aspect, wherein the light beam in the light beam-scanning "A" is scanned such that the adjacent sub-irradiation paths are spaced away from each other.

The third aspect: The method according to the first or second aspect, wherein the light beam in the light beam-scanning "A" is scanned such that the division of the irradiation path is positioned at least at a portion corresponding to a corner of the three-dimensional shaped object.

The fourth aspect: The method according to any one of the first to third aspects, wherein the light beam in the light beam-scanning "A" is discretely scanned such that the sub-irradiation paths to be adjacent to each other are not continuously light-irradiated.

The fifth aspect: The method according to any one of the first to fourth aspects, wherein a length of each of the sub-irradiation paths is in the range of 1 mm to 10 mm.

INDUSTRIAL APPLICABILITY

The manufacturing method according to an embodiment of the present invention can provide various kinds of articles. For example, in a case where the powder layer is a metal powder layer (i.e., inorganic powder layer) and thus the solidified layer corresponds to a sintered layer, the three-dimensional shaped object obtained by an embodiment of the present invention can be used as a metal mold for a plastic injection molding, a press molding, a die casting, a casting or a forging. While on the other hand in a case where the powder layer is a resin powder layer (i.e., organic powder layer) and thus the solidified layer corresponds to a cured layer, the three-dimensional shaped object obtained by an embodiment of the present invention can be used as a resin molded article.

CROSS REFERENCE TO RELATED PATENT APPLICATION

The present application claims the right of priority of Japanese Patent Application No. 2014-43107 (filed on Mar. 5, 2014, the title of the invention: "METHOD FOR MANUFACTURING THREE-DIMENSIONAL SHAPED OBJECT"), the disclosure of which is incorporated herein by reference.

EXPLANATION OF REFERENCE NUMERALS

22 Powder layer
24 Solidified layer
L Light beam
60 Portion corresponding to periphery of three-dimensional shaped object
60 Light beam-scanning "A"
65 Light beam-scanning "B"
67 Position corresponding to carrier of three-dimensional shaped object
70 Portion corresponding to internal region of three-dimensional shaped object

What is claimed is:

1. A method for manufacturing a three-dimensional shaped object by alternate repetition of a powder-layer forming and a solidified-layer forming, the repetition comprising:

(i) forming a solidified layer by irradiating a predetermined portion of a powder layer with a light beam, thereby allowing one of a sintering of powder in the predetermined portion or a melting and subsequent solidification of the powder; and (ii) forming another solidified layer by newly forming a powder layer on the formed solidified layer, followed by irradiation of a predetermined portion of the newly formed powder layer with the light beam, wherein a scanning of the light beam is divided into light beam-scannings "A" and "B", the light beam-scanning "A" being for the light irradiation of a peripheral portion corresponding to a periphery of the three-dimensional shaped object, the light beam-scanning "B" being for the light irradiation of an internal portion corresponding to a region of the three-dimensional shaped object, and the region being located inside the periphery, the peripheral portion is subjected to a discontinuous light beam-irradiation in the light beam-scanning "A" such that an irradiation path of the light beam is divided into a plurality of sub-irradiation paths, the sub-irradiation paths for the discontinuous light beam-irradiation are along the peripheral portion, and a length of each of the sub-irradiation paths is in a range of 1 mm to 10 mm.

2. The method according to claim 1, wherein the light beam in the light beam-scanning "A" is scanned such that the adjacent sub-irradiation paths are spaced away from each other.

3. The method according to claim 1, wherein the light beam in the light beam-scanning "A" is scanned such that the division of the irradiation path is at least at a position corresponding to a corner of the three-dimensional shaped object.

4. The method according to claim 1, wherein the light beam in the light beam-scanning "A" is discretely scanned such that the sub-irradiation paths to be adjacent to each other are not continuously light-irradiated.

* * * * *